United States Patent
Chang et al.

(10) Patent No.: US 10,623,973 B2
(45) Date of Patent: Apr. 14, 2020

(54) DETECTION DEVICE AND DETECTION METHOD

(71) Applicant: Wistron NeWeb Corp., Hsinchu (TW)

(72) Inventors: Huai-Ming Chang, Hsinchu (TW); Horen Chen, Hsinchu (TW); Tsun-Che Huang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 0 days.

(21) Appl. No.: 15/887,911

(22) Filed: Feb. 2, 2018

(65) Prior Publication Data
US 2019/0246295 A1    Aug. 8, 2019

(51) Int. Cl.
*H04W 24/08* (2009.01)
*H04W 8/00* (2009.01)
*H04W 88/06* (2009.01)

(52) U.S. Cl.
CPC ........... *H04W 24/08* (2013.01); *H04W 8/005* (2013.01); *H04W 88/06* (2013.01)

(58) Field of Classification Search
CPC ............ H01Q 1/243; H01Q 1/00; H01Q 3/00; H01Q 3/2647; H01Q 15/148; H01Q 21/28; H04W 16/10; H04W 16/00; H04W 16/06; H04W 16/28; H04W 72/085; G01S 19/54; H04B 7/0617; H04B 17/21; H04B 7/0413; H04B 7/0626; H04B 7/086; H04L 43/16
See application file for complete search history.

(56) References Cited

U.S. PATENT DOCUMENTS

| | | | |
|---|---|---|---|
| 2006/0073850 A1* | 4/2006 | Cha ................ | H04B 7/0608 455/562.1 |
| 2014/0329562 A1* | 11/2014 | Lea ................ | H01Q 21/24 455/562.1 |
| 2017/0222318 A1* | 8/2017 | Li ................ | H01Q 3/24 |

OTHER PUBLICATIONS

Zhung-Han Wu et al. "A Time-Reversal Paradigm for Indoor Positioning System," IEEE Transactions on Vehicular Technology, Apr. 2015, pp. 1331-1339, vol. 64, No. 4, IEEE, US.

* cited by examiner

*Primary Examiner* — Yemane Mesfin
*Assistant Examiner* — Mon Cheri S Davenport

(57) ABSTRACT

A detection device for communicating with an external device includes a smart antenna, a storage device, and a processor. The smart antenna is capable of switching between a plurality of antenna modes. In each of the antenna modes, the smart antenna transmits a test datum and receives a feedback datum according to the test datum, the processor performs a time reversal algorithm to the feedback datum so as to obtain a time reversal datum, the processor calculates an indicator according to the feedback datum and the time reversal datum, and the storage device stores the feedback datum, the time reversal datum, and the indicator. The processor compares all of the indicators with each other and controls the smart antenna to select the final mode of the antenna modes according to a comparison between all of the indicators.

9 Claims, 4 Drawing Sheets

In each of the antenna modes, transmit a test datum and receive a feedback datum according to the test datum, perform a time reversal algorithm to the feedback datum so as to obtain a time reversal datum, and calculate an indicator according to the feedback datum and the time reversal datum — S410

Compare all of the indicators with each other, and control the smart antenna to select a final mode of the antenna modes according to a comparison between all of the indicators — S420

DETECTION DEVICE AND DETECTION METHOD

BACKGROUND OF THE INVENTION

Field of the Invention

The disclosure generally relates to a detection device, and more particularly to a detection device for use in the field of smart antennas.

Description of the Related Art

With advancements in mobile communication technology, mobile devices such as portable computers, mobile phones, multimedia players, and other hybrid functional portable electronic devices have become more common. To satisfy consumer demands, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

Communication devices with smart antennas allow mobile devices in the room to connect to the Internet at a high speed. Generally, smart antennas can switch between multiple modes. It has become a critical challenge for antenna designers to design a standard process for controlling smart antennas, which can automatically select the best mode for wireless communication.

BRIEF SUMMARY OF THE INVENTION

In an exemplary embodiment, the invention is directed to a detection device for communicating with an external device. The detection device includes a smart antenna, a device, and a processor. The smart antenna is capable of switching between a plurality of antenna modes. In each of the antenna modes, the smart antenna transmits a test datum and receives a feedback datum according to the test datum, the processor performs a time reversal algorithm to the feedback datum so as to obtain a time reversal datum, the processor calculates an indicator according to the feedback datum and the time reversal datum, and the storage device stores the feedback datum, the time reversal datum, and the indicator. The processor compares all of the indicators with each other and controls the smart antenna to select the final mode of the antenna modes according to a comparison between all of the indicators.

In another exemplary embodiment, the invention is directed to a detection method using a detection device for communicating with an external device. The detection device includes a smart antenna which is capable of switching between a plurality of antenna modes. The detection method includes the steps of: in each of the antenna modes, transmitting a test datum and receiving a feedback datum according to the test datum, performing a time reversal algorithm to the feedback datum so as to obtain a time reversal datum, and calculating an indicator according to the feedback datum and the time reversal datum; and comparing all of the indicators with each other, and controlling the smart antenna to select the final mode of the antenna modes according to a comparison between all of the indicators.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
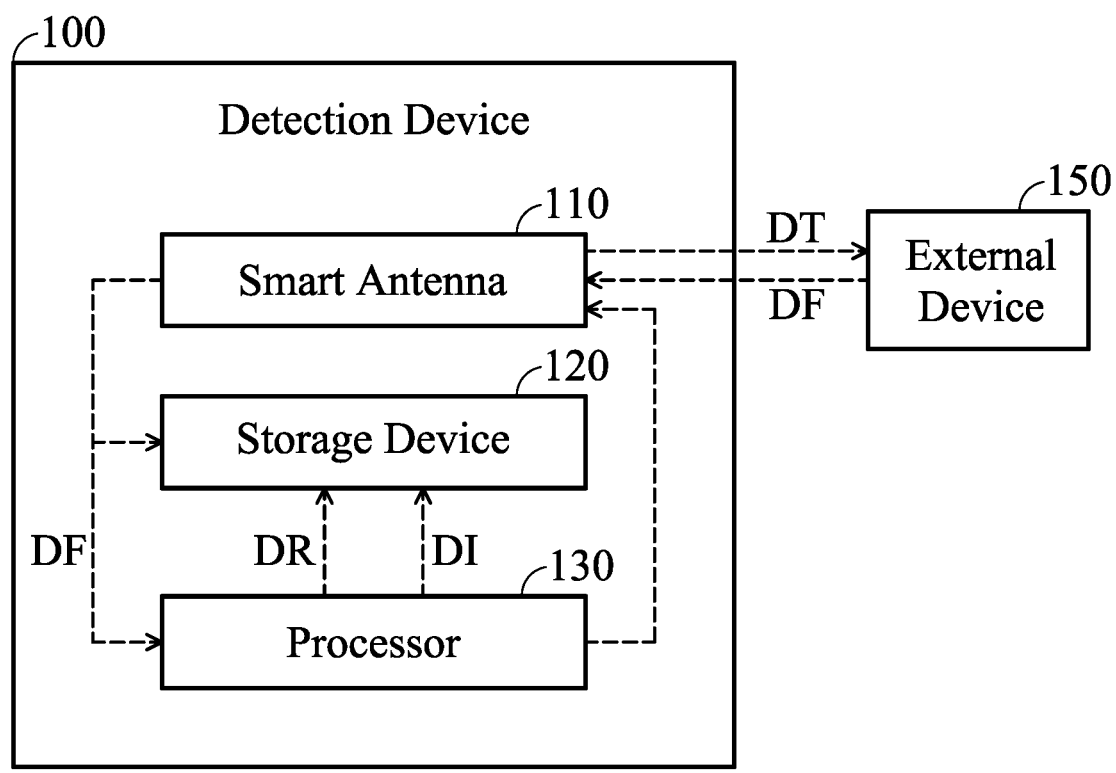
FIG. 1 is a diagram of a detection device according to an embodiment of the invention.

FIG. 1 is a diagram of a detection device 100 according to an embodiment of the invention. The detection device 100 can wirelessly communicate with an external device 150. The external device 150 may be separate from the detection device 100. For example, the detection device 100 may be a server end, such as a wireless access point, and the external device 150 may be a client end, such as a mobile device, but they are not thereto. The detection device 100 is configured to determine whether a surrounding environment changes. The aforementioned surrounding environment is the place where the detection device 100 and the external device 150 are positioned, such as an indoor environment. For example, if any door is opened or closed, the indoor environment may be changed, but it is not limited thereto. As shown in FIG. 1, the communication device 100 includes a smart antenna 110, a storage device 120, and a processor 130. The smart antenna 110 is capable of switching between a plurality of different antenna modes, so as to communicate with the external device 150 using the selected/switched antenna mode. The storage device 120 can include any one of a combination of volatile memory elements (e.g., random-access memory (RAM, such as DRAM, and SRAM, etc.)) or nonvolatile memory elements. The processor 130 may include any custom-made or commercially available processor, a central processing unit (CPU), an auxiliary processor, a semiconductor-based microprocessor, a macroprocessor, one or more application specific integrated circuits (ASICs), a plurality of suitably configured digital logic gates, or other well known electrical configurations including discrete elements both individually and in various combinations to coordinate the overall operation of the computing system. In some embodiments, the storage device 120 can store computer software. The processor 130 is configured to execute the computer software stored in the storage device 120, and control the smart antenna 110 and perform the steps and operations of the invention. In alternative embodiments, the storage device 120 and the processor 130 are implemented with hardware logic circuitry to control the smart antenna 110 and perform the steps and operations of the invention.

Figure 2:
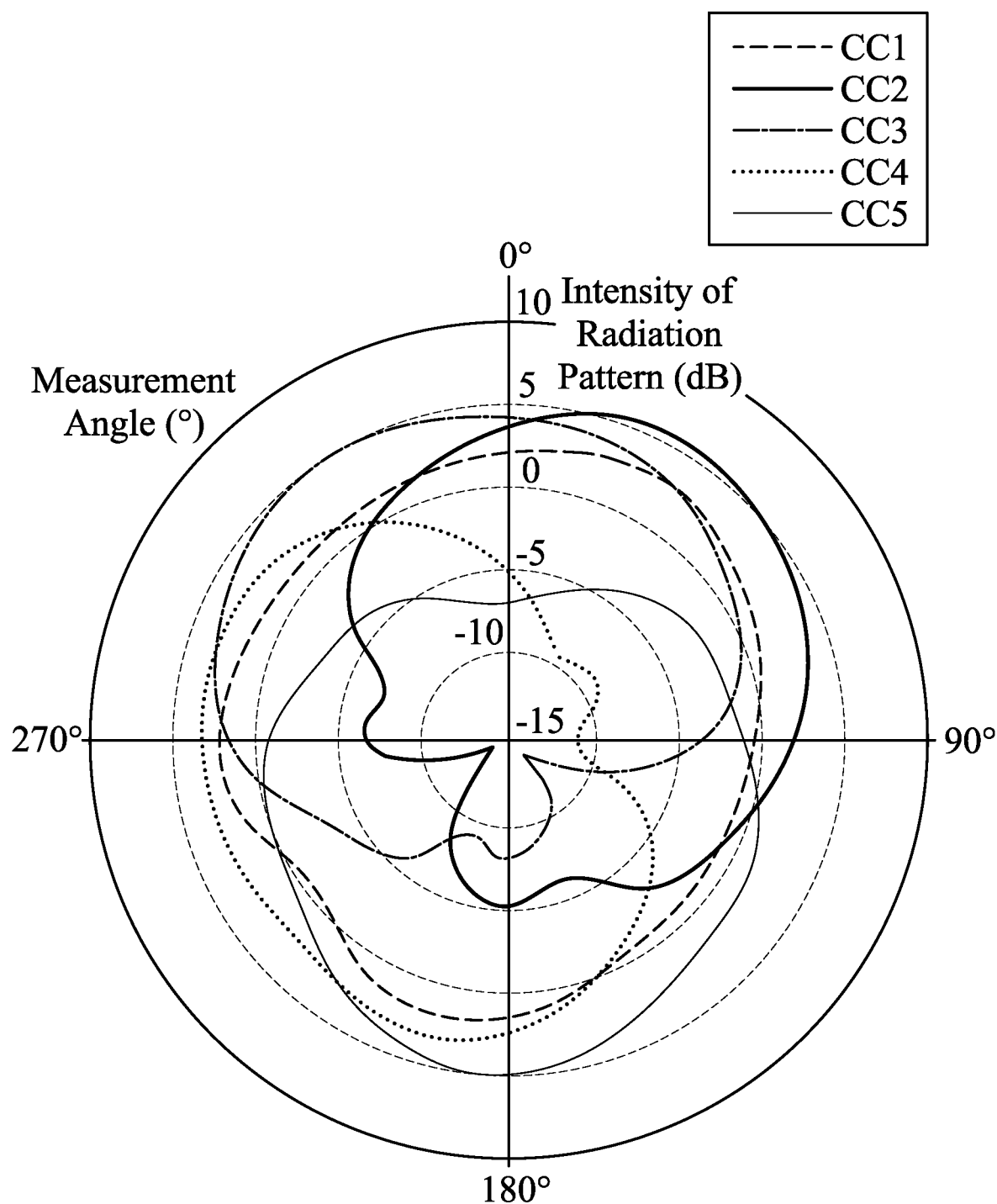
FIG. 2 is a diagram of a smart antenna operating in different antenna modes to an embodiment of the invention.

FIG. 2 is a diagram of the smart antenna 110 operating in different antenna modes according to an embodiment of the invention. In the embodiment of FIG. 2, the aforementioned antenna modes include different radiation patterns. For example, as shown in FIG. 2, a first curve CC1, a second curve CC2, a third curve CC3, a fourth curve CC4, a fifth curve CC5 may represent five different radiation patterns of the smart antenna 110. Specifically, the first curve CC1 may be an omnidirectional radiation pattern, and the other curves CC2 to CC5 may be respective directional radiation patterns. The shapes of the aforementioned radiation patterns are adjustable according to different requirements. The processor 130 can control the smart antenna 110 to selectively use one of the different radiation patterns (e.g., one of CC1 to CC5) for wirelessly communicating with the external device 150. It should be understood that the smart antenna 110 may have fewer or more radiation patterns although there are exactly five radiation patterns displayed in FIG. 2.

Figure 3:
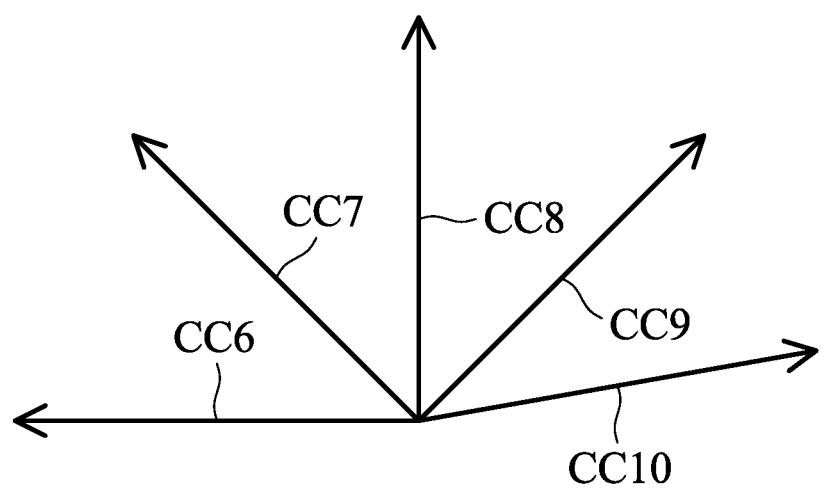
FIG. 3 is a diagram of a smart antenna operating in different antenna modes according to another embodiment of the invention.

FIG. 3 is a diagram of the smart antenna 110 operating in different antenna modes according to another embodiment of the invention. In the embodiment of FIG. 3, the aforementioned antenna modes include different polarization directions. For example, as shown in FIG. 3, a sixth curve CC6, a seventh curve CC7, an eighth curve CC8, a ninth curve CC9, and a tenth curve CC10 may represent five different polarization directions of the smart antenna 110. Specifically, the sixth curve CC6 may be a horizontal polarization direction, and the eighth curve CC8 may be vertical polarization direction. The orientations of the aforementioned polarization directions are adjustable according to different requirements. The processor 130 can control the smart antenna 110 to selectively use one of the different polarization directions (e.g., one of CC6 to CC10) for wirelessly communicating with the external device 150. It should be understood that the smart antenna 110 may have fewer or more polarization directions although there are exactly five polarization directions displayed in FIG. 3.

Generally, the processor 130 can control the smart antenna 110 to switch to all of the antenna modes one after another. Next, the processor 130 can evaluate feedback data relative to the antenna modes and accordingly select the best mode among them. The following embodiments will describe the operations in each of the antenna modes. It should understood that if there are N antenna modes ("N" is a positive integer) of the smart antenna 110, the following procedure may be performed N times for respectively testing the N antenna modes. In the beginning, the smart antenna 110 transmits a test datum DT and receives a feedback datum DF according to the test datum DT. For example, the smart antenna 110 may transmit the test datum DT to the external device 150 and then receive the feedback datum DF from the external device 150, such that the feedback datum DF may be determined according to the test datum DT. The test datum DT may include a pulse signal. During a training stage of the detection device 100, the smart antenna 110 receives the feedback datum DF including a reference channel impulse response $h_1$, which is about channel information defined and measured from the detection device 100 to the external device 150 (i.e., the detection device 100 is considered as a transmitter, and the external device 150 is considered as a receiver). During a working stage of the detection device 100, the smart antenna 110 receives the feedback datum DF including an instant channel impulse response $h_2$, which is about channel information defined and measured from the external device 150 to the detection device 100 (i.e., the external device 150 is considered as a transmitter, and the detection device 100 is considered as a receiver). For example, the reference channel impulse response $h_1$ may be unchanged, but instant channel impulse response $h_2$ may be time-variant in response different environmental conditions. The reference channel impulse response $h_1$ and the instant channel impulse response $h_2$ may be obtained from the feedback datum DF at different times. Next, the processor 130 performs a time reversal algorithm to the feedback datum DF so as to obtain a time reversal datum DR. The so-called "time reversal algorithm" may be referred to "A Time-Reversal Paradigm for Indoor Positioning System" (IEEE TRANSACTIONS ON VEHICULAR TECHNOLOGY, VOL. 64, NO. 4, APRIL 2015), the entirety of which is incorporated by reference herein. Specifically, the time reversal algorithm may be applied to the instant impulse response $h_2$, such that the time reversal datum DR may include a time reversal channel impulse response $g_2$ relative to the instant channel impulse response $h_2$. For example, if the time reversal algorithm is used for the instant channel impulse response $h_2$, the instant channel impulse response $h_2$ will be converted into the time reversal channel impulse response $g_2$. Then, the processor 130 calculates an indicator DI according to the feedback datum DF and the time reversal datum DR. The storage device 120 stores the feedback datum DF, the time reversal datum DR, and the indicator DI in each of the antenna modes. The processor 130 can write data into the storage device 120 or read data from the storage device 120. For example, after N antenna modes ("N" is a positive integer) of the smart antenna 110 are evaluated by the processor 130, the storage device 120 may store N feedback data DF, N time reversal data DR, and N indicators DI, which correspond to the N antenna modes, respectively.

In some embodiments, the indicator DI includes a resonant strength based on the reference channel impulse response $h_1$ and the time reversal channel impulse response $g_2$, and it can be calculated according to the equation (1).

$$\eta = \frac{\max_{i=1}^{L} |(h_1 * g_2)(i)|}{\sqrt{\sum_{i=1}^{L} |h_1(i)|^2} \cdot \sqrt{\sum_{j=1}^{L} |g_2(j)|^2}} \quad (1)$$

where "$\eta$" represents the resonant strength, "$h_1(i)$" represents the reference channel impulse response measured in "i"th tap, "$g_2(j)$" represents the time reversal channel impulse response measured in "j"th tap, "$(h_1*g_2)(i)$" represents a convolution of the reference channel impulse response and the time reversal channel impulse response measured in "i"th tap, and "L" represents the total length of taps.

In some embodiments, the indicator DI includes a correlation coefficient based on the reference channel impulse response $h_1$ and the time reversal channel impulse response $g_2$, and it can be calculated according to the equation (2).

$$r = \frac{\sum_{i=1}^{L}(x_i - \bar{x})(y_i - \bar{y})}{\sqrt{\sum_{i=1}^{L}(x_i - \bar{x})^2} \cdot \sqrt{\sum_{i=1}^{L}(y_i - \bar{y})^2}} \quad (2)$$

where "r" represents the correlation coefficient, "$x_i$" represents the reference channel impulse response measured in "i"th tap, "$\bar{x}$" represent the average of the reference channel impulse responses measured in all of the taps, "$y_i$" represents the time reversal channel impulse response measured in "i"th tap, "$\bar{y}$" represent the average of the time reversal channel impulse responses measured in all of the taps, and "L" represents the total length of taps.

In some embodiments, the resonance strength η and the correlation coefficient r are normalized, and their ranges are from 0 to 1. If the resonance strength η and the correlation coefficient r are close to 0 (e.g., smaller than a low threshold value, such as 0.2), it may mean that the environment (e.g., an indoor environment where the detection device 100 and the external device 150 are located) changes so much (with different instant channel impulse responses); conversely, if the resonance strength η and the correlation coefficient r are close to 1 (e.g., greater than a high threshold value, such as 0.8), it may mean that the environment is almost unchanged (with almost the same instant channel impulse response). Therefore, the detection device 100 and the processor 130 thereof can determine whether the surrounding environment changes according to the resonance strength or the correlation coefficient r.

After all of the antenna modes of the smart antenna 110 are evaluated and their corresponding indicators DI are calculated, the processor 130 compares all of the indicators DI with each other, and controls the smart antenna 110 to select the final mode of the antenna modes according to the comparison between all of the indicators DI. For example, if the processor 130 obtains N indicators DI corresponding to N antenna modes of the smart antenna 110 ("N" is a positive integer), the processor 130 may select a specific indicator the N indicators and determine the final mode corresponding to the specific indicator.

In some embodiments, the final mode corresponds to the average of all of the indicators DI. That is, the processor 130 selects one of the antenna modes as the final mode, and the indicator DI of the selected antenna mode is equal to, substantially equal to, or close to the average of all of the indicators DI. If the indicators DI depend on resonance strengths, the average of the indicators DI may be calculated according to the equation (3). Alternatively, if the indicators DI depend on correlation coefficients, the average of the indicators DI may be calculated according to the equation (4).

$$A = \frac{\sum_{i=1}^{N}\eta_i}{N} \quad (3)$$

$$B = \frac{\sum_{i=1}^{N}r_i}{N} \quad (4)$$

where "A" or "B" represents the average of the indicators, "$\eta_i$" represents the resonance strength of "i"th antenna mode, "$r_i$" represents the correlation coefficient of "i"th antenna mode, and "N" represents the total number of antenna modes of the smart antenna 110.

In some embodiments, the final mode corresponds to the minimum of all of the indicators DI. That is, the processor 130 selects one of the antenna modes as the final mode, and the indicator DI of the selected antenna mode is the smallest one among all of the indicators DI. If the indicators DI depend on resonance strengths, the minimum of the indicators DI may be calculated according to the equation (5). Alternatively, if the indicators depend on correlation coefficients, the minimum of the indicators DI may be calculated according to the equation (6).

$$C = \min_{i=1}^{N}(\eta_i) \quad (5)$$

$$D = \min_{i=1}^{N}(r_i) \quad (6)$$

where "C" or "D" represents the minimum of the indicators, "$\eta_i$" represents the resonance of "i"th antenna mode, and "$r_i$" represents the correlation coefficient of "i"th antenna mode, and "N" represents the total number of antenna modes of the smart antenna 110.

Figure 4:
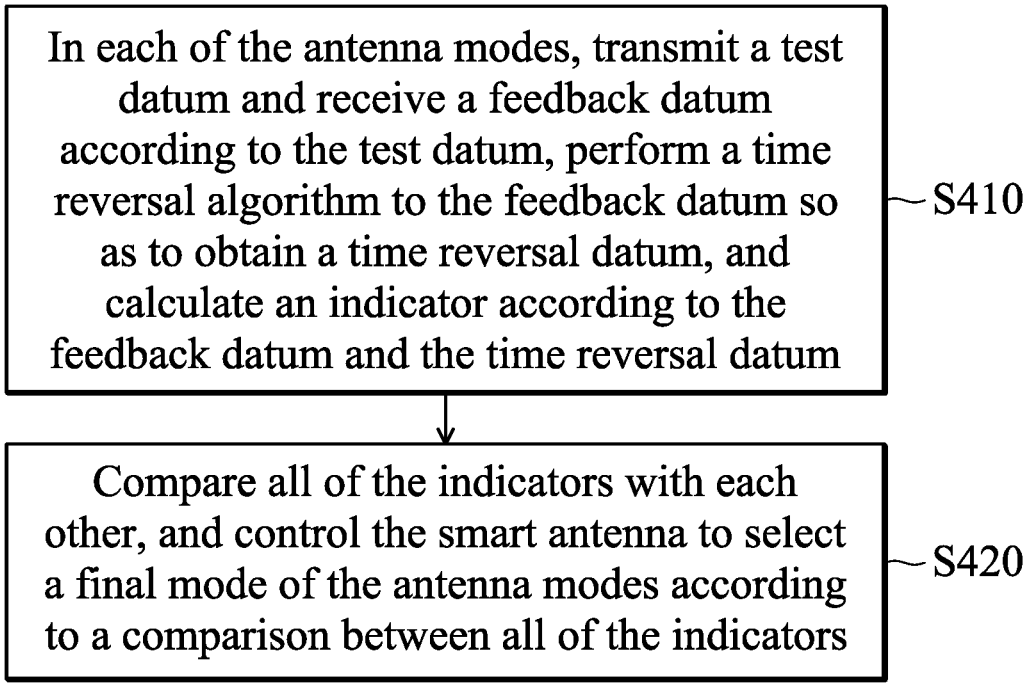
FIG. 4 is a flowchart of a detection method according to an embodiment of the invention.

FIG. 4 is a flowchart of a detection method according to an embodiment of the invention. The detection method uses a detection device for communicating with an external device. The detection device includes a smart antenna which is capable of switching between a plurality of antenna modes. In step S410, in each of the antenna modes, a test datum is transmitted and a feedback datum is received according to the test datum, a time reversal algorithm is performed to the feedback datum so as to obtain a time reversal datum, and an indicator is calculated according to the feedback datum and the time reversal datum. In step S420, all of the indicators are compared with each other, and the smart antenna is controlled to select the final mode of the antenna modes according to a comparison between all of the indicators. In some embodiments, the detection method further includes the step of using the detection device to determine whether a surrounding environment changes. It should be understood that the above steps are not required to be performed in order, and every device feature of the embodiments of FIGS. 1 to 3 may be applied to the detection method of FIG. 4.

The invention proposes a novel detection device and a novel detection method. According to the practical measurements, the proposed design has at least the following advantages over the prior art: (1) enhancing the detection accuracy of the detection device, (2) increasing the identification rate of the detection device, and (3) reducing the probability of false judgments of the detection device. Therefore, the invention is suitable for application in a variety of time-variant indoor environments.

Note that the above parameters are not limitations of the invention. A designer can fine-tune these settings or values according to different requirements. It should be that the detection device and the detection method of the invention are not limited to the configurations of FIGS. 1-4. The invention may merely include any one or more features of any one or more embodiments of FIGS. 1-4. In other words, not all of the features displayed in the figures should be implemented in the detection device and the detection method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A detection device for communicating with an external device, comprising:
    a smart antenna, wherein the smart antenna is capable of switching between a plurality of antenna modes;
    a storage device; and
    a processor;
    wherein in each of the antenna modes, the smart antenna transmits a test datum and receives a feedback datum according to the test datum, the processor performs a time reversal algorithm to the feedback datum so as to obtain a time reversal datum, the processor calculates an indicator according to the feedback datum and the time reversal datum, and the storage device stores the feedback datum, the time reversal datum, and the indicator,
    wherein the feedback datum comprises a reference channel impulse response and an instant channel impulse response which are obtained at different times,
    wherein the time reversal datum comprises a time reversal channel impulse response relative to the instant channel impulse response,
    wherein the indicator comprises a resonant strength based on the reference channel impulse response and the time reversal channel impulse response as follows:

$$\eta = \frac{\max_{i=1}^{L} |(h_1 * g_2)(i)|}{\sqrt{\sum_{i=1}^{L} |h_1(i)|^2} \cdot \sqrt{\sum_{j=1}^{L} |g_2(j)|^2}}$$

where "$\eta$" represents the resonant strength, "$h_1(i)$" represents the reference channel impulse response measured in "i"th tap, "$g_2(j)$" represents the time reversal channel impulse response measured in "j" th tap, "$(h_1*g_2)(i)$" represents a convolution of the reference channel impulse response and the time reversal channel impulse response measured in "i"th tap, and "L" represents a total length of the taps;
    wherein the processor compares all of the indicators with each other and controls the smart antenna to select a final mode of the antenna modes according to a comparison between all of the indicators;
    wherein the final mode corresponds to an average of all of the indicators or a minimum of all of the indicators.

2. The detection device as claimed in claim 1, wherein the detection device is configured to determine whether a surrounding environment changes.

3. The detection device as claimed in claim 1, wherein the antenna modes comprise different radiation patterns of the smart antenna.

4. The detection device as claimed in claim 1, wherein the antenna modes comprise different polarization directions of the smart antenna.

5. A detection method using a detection device for communicating with an external device, the detection device comprising a smart antenna which is capable of switching between a plurality of antenna modes, and the detection method comprising the steps of:
    in each of the antenna modes, transmitting a test datum and receiving a feedback datum according to the test datum, performing a time reversal algorithm to the feedback datum so as to obtain a time reversal datum, and calculating an indicator according to the feedback datum and the time reversal datum,
    wherein the feedback datum comprises a reference channel impulse response and an instant channel impulse response which are obtained at different times,
    wherein the time reversal datum comprises a time reversal channel impulse response relative to the instant channel impulse response,
    wherein the indicator comprises a resonant strength based on the reference channel impulse response and the time reversal channel impulse response as follows:

$$\eta = \frac{\max_{i=1}^{L} |(h_1 * g_2)(i)|}{\sqrt{\sum_{i=1}^{L} |h_1(i)|^2} \cdot \sqrt{\sum_{j=1}^{L} |g_2(j)|^2}}$$

where "$\eta$" represents the resonant strength, "$h_1(i)$" represents the reference channel impulse response measured in "i"th tap, "$g_2(j)$" represents the time reversal channel impulse response measured in "j" th tap, "$(h_1*g_2)(i)$" represents a convolution of the reference channel impulse response and the time reversal channel impulse response measured in "i"th tap, and "L" represents a total length of the taps; and comparing all of the indicators with each other, and controlling the smart antenna to select a final mode of the antenna modes according to a comparison between all of the indicators;

wherein the final mode corresponds to an average of all of the indicators or a minimum of all of the indicators.

6. The detection method as claimed in claim 5, further comprising:

using the detection device to determine whether a surrounding environment changes.

7. The detection method as claimed in claim 5, wherein the antenna modes comprise different radiation patterns of the smart antenna.

8. The detection method as claimed in claim 5, wherein the antenna modes comprise different polarization directions of the smart antenna.

9. A detection method using a detection device for communicating with an external device, the detection device comprising a smart antenna which is capable of switching between a plurality of antenna modes, and the detection method comprising the steps of:

in each of the antenna modes, transmitting a test datum and receiving a feedback datum according to the test datum, performing a time reversal algorithm to the feedback datum so as to obtain a time reversal datum, and calculating an indicator according to the feedback datum and the time reversal datum, wherein the feedback datum comprises a reference channel impulse response and an instant channel impulse response which are obtained at different times;

wherein the time reversal datum comprises a time reversal channel impulse response relative to the instant channel impulse response;

wherein the indicator comprises a correlation coefficient based on the reference channel impulse response and the time reversal channel impulse response as follows:

$$r = \frac{\sum_{i=1}^{L}(x_i - \bar{x})(y_i - \bar{y})}{\sqrt{\sum_{i=1}^{L}(x_i - \bar{x})^2} \cdot \sqrt{\sum_{i=1}^{L}(y_i - \bar{y})^2}}$$

where "r" represents the correlation coefficient, "$x_i$" represents the reference channel impulse response measured in "i"th tap, "$\bar{x}$" represents an average of the reference channel impulse responses measured in all of the taps, "$y_i$" represents the time reversal channel impulse response measured in "i"th tap, "$\bar{y}$" represents an average of the time reversal channel impulse responses measured in all of the taps, and "L" represents a total length of the taps; and comparing all of the indicators with each other, and controlling the smart antenna to select a final mode of the antenna modes according to a comparison between all of the indicators;

wherein the final mode corresponds to an average of all of the indicators or a minimum of all of the indicators.

\* \* \* \* \*